May 22, 1956  P. VAN ACKEREN  2,746,914
ARRANGEMENT FOR CHANGING THE HEATING DIRECTIONS
OF REGENERATIVE FURNACES HEATED
BY PRE-HEATED POOR GAS
Filed April 1, 1953
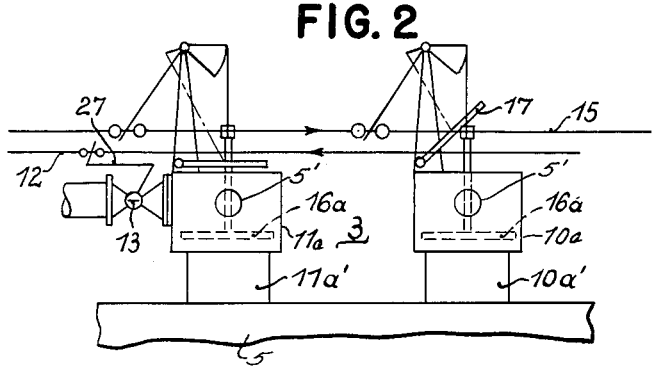
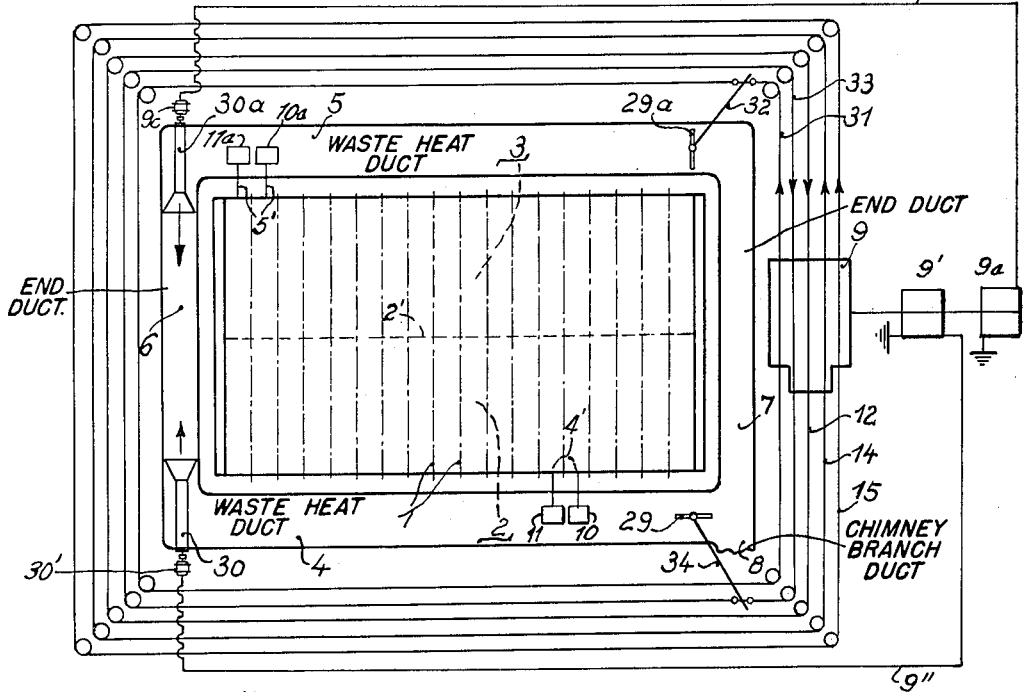
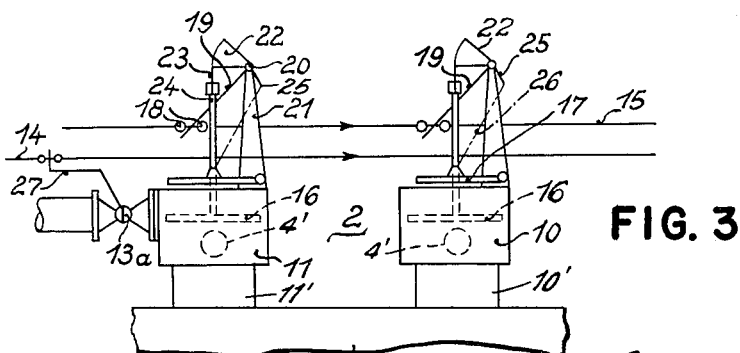
INVENTOR.
Paul van Ackeren
BY Thomas J. P. O'Brien
ATTORNEY United States Patent Office 2,746,914
Patented May 22, 1956

2,746,914

ARRANGEMENT FOR CHANGING THE HEATING DIRECTIONS OF REGENERATIVE FURNACES HEATED BY PRE-HEATED POOR GAS

Paul Van Ackeren, Essen, Germany, assignor, by mesne assignments, to Koppers Company, Inc., Pittsburgh, Pa., a corporation of Delaware Application April 1, 1953, Serial No. 346,142

4 Claims. (Cl. 202—142)

The invention relates to an arrangement for changing the heating direction of regenerative furnaces heated by pre-heated poor gas, especially batteries of regenerative coke ovens.

In the changing over of the heating direction of regenerative furnaces, more or less great losses occur owing to the fact that the regenerators serving to pre-heat the poor gas are still full of combustible gas when the gas change-over devices are closed. The combustible gas still present in the regenerators is then forced into the waste-heat duct if no special measures are taken to burn it in the heating flues. If the combustible gas comes into contact with air in the waste-heat duct, explosions may occur. The precaution hitherto taken, which consists in providing a short purge pause in the changing of the heating direction immediately after the closing of the gas change-over devices, during which pause further air flows in for the purpose of completely burning the gas, does not afford sufficient safety.

The object of the invention is so to effect the change of the heating direction in regenerative furnaces that the combustible gas still present in the poor gas regenerators at the period of change-over is reliably burnt by a further supply of air into the heating flues.

In accordance with the invention, this object is achieved by first closing, during the change-over operation, the valve devices for inflow of the poor gas to the regenerators that are set for pre-heating and having the waste gas heat duct of these poor gas regenerators simultaneously cut off from a flue leading to a chimney at one end, while into the other end of the waste gas duct, waste gas is circulated, by means of a blower, from the corresponding waste heat duct valves, and regenerators that are then subjected to the action of outflow of waste heat, with passage of the circulated waste heat gas through the waste-heat valves for outflow to the duct from the regenerators then set for inflow, which waste heat valves are at first only partially open, and thence into the poor gas regenerators then serving for the preheating, until the combustible gases present in the heating system have been completely burnt. After this purge pause in the change-over operation for the change in direction of combustion of the poor gas, the further change-over operations take place, the air-waste heat valve devices first being completely changed over, whereafter the gas inflow valves device on the side for the next preheating of the regenerators is opened with simultaneous opening of the device cutting off the waste heat duct at one end from the chimney flue and stopping of the blower for circulating the waste heat gas.

The invention accordingly further resides, for carrying out this method, in providing at one end of two waste-heat ducts, which are connected together at both ends by shut-off devices, and at the other ends by blower fans. By closing off from the chimney, the waste-gas duct of the regenerators set for pre-heating during the change-over of the heating direction, with the simultaneous cutting off of the poor gas supply, and simultaneous starting of the corresponding blower fan, the waste gases flowing out to the chimney from the then operating waste heat regenerators are forced into the waste gas duct of the regenerators set for inflow preheating, and are forced into these regenerators through the waste heat valve devices, which are at the same time only partially open. At the instant determined by the removal of the heating gas from the regenerators, the completion of the change-over of the valves for the air and waste heat takes place on both regenerator sides, followed by the opening of the poor gas valve devices of the regenerators which are now set for inflow pre-heating, and the opening of the shut-off device by which waste-gas duct was hitherto shut off at one end to the chimney flue, and the stopping of the circulating blower.

The movement of the shut-off members by which the ducts for the previously operating pre-heating regenerators is cut off at one end from the chimney flue, and the simultaneous starting of the circulating blowers is effected in accordance with the invention by the conventional change-over reversing mechanism, such as a winch. For this purpose, for example, the shut-off members, by which the waste-gas ducts are shut off, may be connected for operation by a traction member to the change-over winch on which a contact drum may be arranged to be operated to open and close the circuits of the circulating blowers.

An embodiment of the invention is illustrated by way of example in the drawings, in which:

Figure 1 shows diagrammatically a battery of coke ovens with the change-over winch and the traction members in plan view, Figure 2 shows the position of two of the series of change-over members on one side of the battery of ovens for the reversal of one set of regenerators, and Figure 3 shows the position of two of the series of change-over members on the other side thereof for reversal of the other set of regenerators.

The furnace chambers arranged in juxtaposition and combined to form a battery are conventionally indicated by dot and dash lines 1 in the drawings. On one longitudinal side of the battery are disposed, beneath the coking chambers as conventional, one set of regenerators 2, and on the other longitudinal side of the longitudinal central plane indicated by dotted line 2' of the battery are disposed the other set of regenerators 3 operable in alternation therewith, one set of the regenerators is employed to preheat the heating media (poor gas and air) while the other set stores the yielded heat of the waste gases in alternation with each other as conventional.

The regenerators on each longitudinal side of the battery of ovens are connected, respectively, to waste heat ducts 4, 5, by flow reversal boxes 10, 11, 10a, 11a, through regenerator pipe connections 4', 5'; and waste heat duct pipe connections 10', 11', 10a', 11a'. These ducts 4, 5, are in turn connected together by transverse end ducts 6, 7 arranged at the ends of the battery, the said waste heat ducts passing the waste heat gas through the branch duct 8 to the chimney (not shown).

At one end of the battery of ovens is disposed, as shown at the right hand side of Fig. 1, a conventional regenerator reversing mechanism in the form of change-over winch 9, by means of which the heating direction is changed through the operation of change-over members or flow reversal regenerator boxes 10, 11 and 10a, 11a, respectively, through the intermediary of traction control members operated by the winch and consisting, for example, of rods connected to cables or chains as hereinafter described. The traction member 12 is connected, for example, to the poor gas cocks 13 of the change-over devices 11a on the side for the gas regenerators of the set 3 of the battery by levers 27. The traction member 14 is likewise connected to the poor gas cocks 13a of the change-over members 11 on the side for the gas regenerators of the set 2 of the battery. Finally, the traction member 15 is connected to the waste-heat valves 16, 16a of all the change-over devices on both sides of the battery for all regenerators of the two sets 2 and 3 and to the air flaps 17 by the connecting means by the waste-heat valves 16, 16a, of the change-over devices 10, 10a.

The traction members 12, 14 and 15 form a closed system extending around the battery of ovens. The traction members are provided in the region of the change-over members 10, 11, 10a, 11a, with clamping members 18 between which there is disposed a lever 19 mounted on struts 21 at the pivot point 20. The levers 19 are provided at the pivot point 20 with a segment 22 on which a chain or cable 23 is mounted, which is connected to the valve stem 24 of the waste-heat valve 16, 16a. On the other side of pivot 20, there is provided at the pivot point 20 a lever 25 which is connected to the air flap 17 by means of a traction member 26. By the movement of the traction member 15, the waste heat valves 16, 16a, are closed and the air flaps 17 simultaneously opened and vice versa through the levers 19.

Arranged at the end of the waste-gas ducts 4, 5 nearer to the connecting duct 7 are shut-off flaps 29, 29a by means of which the direct connection of the waste-gas ducts 4, 5, through the transverse duct 7, to the main duct 8 leading to the chimney flue can be established or broken. Arranged at the duct 6, at the other end of the battery, are fan blowers 30, 30a which open at the ends of the waste-gas ducts 4, 5 into the transverse waste-gas duct 6.

The change-over of the heating direction in the arrangement according to the invention takes place in the following manner:

It will be assumed the regenerators 3 on one side of the battery of ovens are set for inflow pre-heating. The regenerators 2 on the other side of the battery are thus set for outflow of waste heat. For the purpose of changing over the heating direction, the change-over winch, or other conventional reversing machine, 9 is first so operated that the poor gas cocks 13 on the regenerator side 3 of the battery are closed by means of the traction member 12. At this time, the shut-off flap 29a is in closed position, as shown in Figure 1, through a traction member 31 connected through a lever 32 to the shut-off valve 29a. In the movement of the change-over winch 9, a contact drum 9' (not shown in detail in the drawing) connected thereto is rotated and closes the circuit 9" of the driving motor 30' of the blower 30.

The blower 30 sucks the waste gases flowing in to the waste-gas duct 4 from the regenerators 2 on that side of the battery and forces them through the duct 5 on the other side of the battery and through branches 11a', and 10', and the waste-heat valves 16a, which are simultaneously also opened, only partially, by the operation of the winch 9, through the traction member 15, and through pipe connections 5' into the regenerators of set 3, then filled with poor gas on the one hand and air on the other hand, on that side of the battery. The partially open position of the waste-heat valves 16a is shown in Figure 2. In order to prevent the closed air flaps 17 on the regenerator side 2 of the battery, which are also connected to the traction member 15, from being thereby opened at the same time, the cam discs of the change-over winch 9 are appropriately adjusted. The change-over winch is therefore also arranged, according to this invention, to operate in such manner that, at the instant when the poor gas cocks begin to close on one regenerator side, as the side 3, the waste-heat valves 16a on that side 3 of the battery have already been opened somewhat by traction member 15, in order that the waste heat may simultaneously commence to flow in through the valves 16a.

At the instant determined by the operation of the change-over winch, and after the gas has been forced out of the regenerators into the heating flues, the traction members 15 are further moved and the waste-heat valves 16a on the regenerator side 3 of the battery are completely opened and the air flaps 17 on that side closed. At the same time, the waste heat valves 16 on the regenerator side 2 of the battery are thereby closed and the air flaps 17 on that side opened. Simultaneously therewith, or subsequently thereto, the change-over winch 9 moves the traction member 31 in the opposite direction and thus opens the shut-off valve 29a, so that the connection of the waste-gas duct 5 to the main waste-gas duct 8 through the duct 7 is reestablished. At the same instant, the contact drum 9' of the winch 9 also breaks the circuit of the driving motor 30' of the circulating blower 30. The winch 9 thereafter moves the traction member 14, which opens the poor gas cocks 13a on the regenerator side 2 of the battery, and next, the shut-off flap 29 of the waste-gas duct 4 is correspondingly moved to closed position by means of the lever 34 through a traction member 33 and the blower 30a is placed in circuit 9b through a second contact drum 9a upon the next sequence of operation of winch 9.

I claim:

1. Apparatus for changing the heating direction of regenerative coke ovens heated by preheated poor gas, comprising: the combination with a coke oven heating flue system having two sets of regenerators, each comprising regenerators for inflow of preheated air and regenerators for inflow of preheated poor gas to the heating flue system, a waste gas outlet duct for each set of regenerators, separate chimney outlet valves for shutting off each waste gas duct from a chimney, separate valve controlled inlets for inflow of poor gas to each poor gas regenerator, a regenerator flow reversal box connecting each regenerator with its waste gas duct, each box having a valve device for controlling the flow through the box between the waste gas duct and a regenerator, of a reversing machine for reversing said valves, means for withdrawing waste gas from each waste gas duct and introducing it into the other waste gas duct, means under the control of the reversing machine to operate the poor gas valves for each of the sets of regenerators, means under the control of the reversing machine to operate the waste gas valve devices for each of the sets of regenerators, means under the control of the reversing machine to operate the means for withdrawing waste gas from each of the waste gas ducts and introducing it into the other waste gas duct, and means under the control of the reversing machine for operating the means for shutting off each of the waste gas ducts to a chimney, said reversing machine having its controls for all of the aforesaid means under the control of the reversing machine so set as to first operate, on operation for effecting a change in heating direction, to close the poor gas valves for one set of regenerators, and next operate the means for withdrawing waste gas from the waste gas duct for the other set of regenerators to introduce it into the waste gas duct for said one set of regenerators and also operate the means to operate the waste gas valve devices for said one waste gas duct to slightly open position, while the waste gas duct for said one set of regenerators is still shut off from a chimney and the waste gas duct for the other set of regenerators and their valve devices are still open to a chimney, for purging of the poor gas from the regenerators with waste heat gases.

2. Arrangement according to claim 1, characterized by the chimney shut-off valves for the waste heat ducts being provided at one end of the waste heat ducts, and by said ducts being connected together at both ends, with fan blowers at the ends opposite the ends having the chimney shut-off valves.

3. Arrangement according to claim 2, characterized by an arrangement in which the chimney shut-off valves for the waste heat ducts are connected to be operated by separate control members from the reversing machine.

4. Arrangement according to claim 3, characterized by a separate drive for each fan blower, each drive being separately controlled by a separate contact drum both of which are under control of the reversing machine.

References Cited in the file of this patent

UNITED STATES PATENTS

| | | |
|---|---|---|
| 1,176,067 | Koppers | Mar. 21, 1916 |
| 1,183,401 | Peters | May 16, 1916 |
| 1,597,365 | Keigley et al. | Aug. 24, 1926 |
| 1,920,913 | Pfluke et al. | Aug. 1, 1933 |
| 2,516,929 | Van Ackeren | Aug. 1, 1950 |